United States Patent
Geoghegan et al.

(10) Patent No.: US 6,274,657 B1
(45) Date of Patent: Aug. 14, 2001

(54) SURFACTANT FOR FORMING STABLE DISPERSIONS OF ROSIN ESTERS

(75) Inventors: John T. Geoghegan, Port Chester; Long S. Wang, New City, both of NY (US)

(73) Assignee: Arizona Chemical Company, Panama City, FL (US)

( * ) Notice: Subject to any disclaimer, the term of this patent is extended or adjusted under 35 U.S.C. 154(b) by 0 days.

(21) Appl. No.: 08/189,053

(22) Filed: Jan. 27, 1994

Related U.S. Application Data

(63) Continuation of application No. 07/872,512, filed on Apr. 23, 1992, now abandoned.

(51) Int. Cl.$^7$ ....................................................... C08J 5/24
(52) U.S. Cl. .......................... 524/270; 524/271; 524/272; 524/273; 524/274; 530/218
(58) Field of Search ............................. 530/218; 524/270, 524/271, 272, 273, 274

(56) References Cited

U.S. PATENT DOCUMENTS

| | | | |
|---|---|---|---|
| 4,057,527 | * 11/1977 | Columbus | 524/274 |
| 4,769,406 | 9/1988 | Keithley | 524/100 |
| 4,792,582 | 12/1988 | Hoefer et al. | 524/378 |
| 4,822,526 | * 4/1989 | Tsuchida et al. | 530/218 |
| 5,306,762 | * 4/1994 | Hutter | 524/272 |

\* cited by examiner

*Primary Examiner*—Peter D. Mulcahy
(74) *Attorney, Agent, or Firm*—Luedeka, Neely & Graham, P.C.

(57) ABSTRACT

A surfactant for forming stable dispersions of rosin esters compatible with elastomeric latexes, the surfactant having the formula $R^1$—$R^2$—$R^3$. $R^1$ and $R^3$ are each rosin (i.e., rosin, rosin dimer or a mixture of rosin and rosin dimer). $R^2$ is selected from the group consisting of polyethylene glycol and polyethylene glycol-$R^4$-polyethylene glycol wherein $R^4$ is rosin (i.e., rosin, rosin dimer or a mixture of rosin and rosin dimer). The surfactant is prepared by esterifying the rosin material with polyethylene glycol.

10 Claims, No Drawings

SURFACTANT FOR FORMING STABLE DISPERSIONS OF ROSIN ESTERS

This is a continuation, of application Ser. No. 07/872,512, filed Apr. 23, 1992, abandoned.

The present invention relates to compounds which may be used as surfactants to disperse rosin esters. The present invention also relates to methods for the preparation of such compounds.

Water dispersed adhesives are used extensively to adhere various substrates together. These adhesives typically comprise a high molecular weight elastomeric latex (such as an acrylic or styrene-butadiene rubber [SBR]latex) and a dispersed tackifier resin. The preparation of water-dispersed elastomeric latexes is well known in the art of adhesive preparation as is the preparation of tackifier resins. It is more difficult to produce a stable dispersion of a tackifier resin which is compatible with the latexes. The stabilization of rosin ester tackifier resins is particularly difficult.

Usually, rosin esters must be dispersed at relatively high pressures using rapid stirring. This increases the cost of preparation and therefore decreases the ease of use of such dispersions. In addition, most current commercial dispersions do not provide an adequate level of shear strength or stability.

With these problems in mind, it is an object of the present invention to provide a surfactant for forming stable dispersions of rosin esters compatible with elastomeric latexes.

It is an additional object of the present invention to provide a surfactant which is preferably capable of forming stable dispersions, at atmospheric pressure, of rosin esters having a variety of softening points.

It is another object of the present invention to provide a surfactant which is preferably capable of forming dispersions having an average particle size of less than about 2.0 micron.

The present inventors have discovered that esterifying rosins, rosin dimers or a mixture of rosins and rosin dimers with polyethylene glycol (PEG) produces a surfactant which will form a stable dispersion of rosin ester which is compatible with acrylic latexes. The term "rosin" is used herein and in the claims, unless otherwise noted, to refer to rosin, rosin dimer or a mixture of rosin and rosin dimer. Rosin chiefly comprises resin acids of the abietic and pimaric types having acid numbers greater than 100. The esterification involves the direct treatment of a rosin with polyethylene glycol. The reaction is complete after about 5 hours when the resulting product has an acid number of about 2.

One method of preparation of the surfactant of the present invention comprises the reaction of the rosin and polyethylene glycol in the presence of a catalytic amount of hypophosphorous acid with a reaction temperature of between about 260° C. and about 290° C. under a nitrogen atmosphere. Typically, the reaction requires about 5 hours to go to substantial completion. The stoichiometry of the rosin to polyethylene glycol determines the hydrophobe to lipophobe balance and structure of the final surfactant. The rosin-to-rosin dimer ratio on the surfactant also affects the structure of the final surfactant.

As used in the present invention, the rosin is either rosin monomers, rosin dimers or a mixture of monomers and dimers. The rosin generally has an acid number of between about 140 and about 185. The equivalent weight of the rosin typically falls between about 302 and about 400.

The PEG, as used in the present invention, has a molecular weight of between about 1,000 and about 20,000.

More specifically, treating 15 g of SYLVATAC 140 (Arizona Chemical), equivalent weight 400, a rosin-rosin dimer mixture containing about 60–70% of dimerized rosin, with 200 g of PEG (molecular weight of 8000) results in the formation of a surfactant with the structure of rosin-PEG/rosin-PEG-rosin. Treating 10 g of SYLVATAC 140 with 200 g of PEG in a similar manner yields a surfactant with polymeric structures such as PEG-rosin-PEG, rosin-PEG-rosin-PEG, etc. Treating 13.5 g of SYLVATAC 295 (Arizona Chemical), equivalent weight 359, a rosin-rosin dimer mixture containing about 30% of dimerized rosin, with 200 g of PEG in a similar manner also gives a surfactant with polymeric structures. Each of these surfactants will function effectively to disperse rosin ester tackifier resins in water.

In making a dispersion of a tackifier, the tackifier resin is heated to above its melting point (generally, below 98° C.). A mixture of surfactant, as prepared above, and water is then added with stirring to the melted tackifier resin. The stirring can be, but need not be, carried out at atmospheric pressure with good results. Generally, the mixture of tackifier, surfactant and water is stirred for one hour at a moderate speed. After the inversion point is reached (i.e., after the water just becomes the continuous phase) additional hot water is slowly added until the dispersion is at the desired solids content (usually about 60%). The dispersion is then cooled to room temperature slowly. The final dispersion has a particle size of about 2.0 micron or less and is stable.

The dispersion is compatible with elastomeric latexes and is used to prepare appropriate adhesives. In preferred embodiments of the invention, the elastomer latexes are selected from the group consisting of acrylic or styrene-butadiene rubber.

In order to provide a further understanding of the present invention, the following examples are given by way of illustration and not by way of limitation.

EXAMPLE I
Preparation of Surfactant

A rosin, 15 g, was charged into a three-neck flask. The rosin was a rosin-rosin dimer mixture containing about 60–70% of dimerized rosin (SYLVATAC 140, Arizona Chemical) with an acid number of 140. Polyethylene glycol, 199 g, with a molecular weight of 8,000 and 50% hypophosphorous acid catalyst or 50% phosphoric acid catalyst, 0.2% based on total weight, were added to the flask. The charge in the flask was reacted at 275° C. under a nitrogen atmosphere for a period of about 5 hours, at which point the reaction product had an acid number of less than 2. The resulting PEG ester of the rosin had surfactant properties and a melting point of 59.4° C. as determined by differential scanning calorimetry (DSC). The surfactant is predominantly a mixture of structures containing one PEG chain per molecule as determined by gel permeation chromatography (GPC).

EXAMPLE II
Preparation of Surfactant

The reaction of Example I was repeated using 10 g of SYLVATAC 140. The resulting surfactant comprised about 33% (by weight) of species having two PEG chains per molecule and about 67% of species having one PEG chain per molecule (as determined by GPC).

EXAMPLE III
Preparation of Surfactant

The reaction of Example I was repeated using 13.5 g of SYLVATAC 295 (Arizona Chemical). The resulting surfactant comprised about 22% (by weight) of species containing two PEG chains per molecule and about 78% of species having one PEG chain per molecule (as determined by GPC).

EXAMPLE IV

Preparation of Tackifier Resin Dispersion

A tackifier resin, 250 g, was charged into a three-neck flask maintained at 98° C. The flask was equipped with a mechanical stirrer, water condenser and thermometer. The tackifier resin was a rosin ester (ZONESTER 85, molecular weight 650, softening point 83° C., Arizona Chemical). The resin was melted and stirred at a temperature of between about 93° C. and 94° C. A solution containing 25 g of water, 15 g of the surfactant from Example I and 0.25 g potassium hydroxide was added to the molten resin. The mixture was stirred for one hour at moderate speed (approximately 100–120 rpm) under atmospheric pressure. After one hour, the inversion point was reached. Additional hot water was slowly added until the dispersion had a solids content of about 60%. The dispersion was cooled to room temperature slowly. The final dispersion had a particle size of about 2.0 micron and was stable for a period of at least one year.

EXAMPLE V

Preparation of Adhesives

A series of water-dispersed adhesives was prepared by mixing an elastomeric latex with a dispersed tackifier resin. For samples A–H, a styrene-butadiene rubber (SBR) latex (DOW 578A, Dow Chemical) was mixed with either the dispersed resin of Example IV or a water-dispersed tackifier resin of the prior art (AQUATAC 6085, Arizona Chemical) comprising a rosin ester tackifier resin in water with a polymeric-type surfactant at 60% solids. The elastomer latex and tackifier dispersions were mixed at the amounts shown in Table I. For samples I–L, an acrylic latex (ROBOND S-95, Rohm & Haas) was mixed with either the dispersed resin of Example II or the water-dispersed tackifier resin of the prior art at the amounts shown in Table I.

TABLE I

| Latex | Tackifier | % Tackifier Added[a] | Sample |
|---|---|---|---|
| SBR[b] | Example II | 20 | A |
| | AQUATAC 6085[d] | 20 | B |
| | Example II | 30 | C |
| | AQUATAC 6085[d] | 30 | D |
| | Example II | 40 | E |
| | AQUATAC 6085[d] | 40 | F |
| | Example II | 50 | G |
| | AQUATAC 6085[d] | 50 | H |
| Acrylic[c] | Example II | 20 | I |
| | AQUATAC 6085[d] | 20 | J |
| | Example II | 30 | K |
| | AQUATAC 6085[d] | 30 | L |

[a]Based on weight of latex
[b]Styrene-butadiene rubber, DOW 578A, Dow Chemical
[c]ROBOND S-95, Rohm & Haas
[d]Rosin ester dispersed in water with an alternate polymeric as a surfactant.

The adhesives were coated onto 1 mil MYLAR (Du Pont) to provide a thickness of 1.0±0.2 mil, air dried 20 minutes then fused in a forced draft oven at 100° C. for 5 minutes. The adhesive samples were tested on a Polyken probe tack tester, for Loop Tack, for 180° Peel, and for Shear Adhesion (500 g, a ½"×½" sample). The results of those tests are shown in Table II. In addition, the adhesive samples with the acrylic latex (Samples I, J, K, and L) were tested using a one square inch contact surface for Shear Adhesion using a 1 kg hanging weight; the same test conditions were employed for the Shear Adhesion Failure Temperature, as is shown in Table III.

TABLE II

| Sample | Polyken Probe (g) | Loop Tack (oz/in) | 180° Peel (oz.in) | Shear Adhesion ½" × ½", 500 g (Min) |
|---|---|---|---|---|
| A | 358.1 ± 20.7 | 24 ± 1.5 | 39.2 ± 0.6 | >10,000 |
| B | 297.5 ± 40.6 | 22 ± 2.0 | 41.6 ± 4.6 | >10,000 |
| C | 470 ± 27.5 | 34 ± 2.0 | 50.3 ± 3.0 | >10,000 |
| D | 392 ± 55 | 28 ± 2.0 | 48.5 ± 4.7 | >10,000 |
| E | 605 ± 54 | 49 ± 1.0 | 74.4 ± 5.8[a] | 2,604 ± 220 |
| F | 474 ± 37 | 40 ± 2.0 | 58.8 ± 1.5 | 968.2 ± 112 |
| G | 550 ± 54 | 78 ± 2.0 | 82.4 ± 5.3[b] | 537 ± 28 |
| H | 520 ± 61 | 60 ± 2.0 | 74.1 ± 1.9[b] | 582 ± 14 |
| I | 560.1 ± 39.5 | 42 ± 1.0 | 30.6 ± 4.9 | 163.1 ± 17[b] |
| J | 597.5 ± 39.2 | 38 ± 1.0 | 32.8 ± 1.0 | 163.9 ± 16[b] |
| K | 682.1 ± 62.5 | 48 ± 0.5 | 40.0 ± 3.9 | 123.5 ± 9[b] |
| L | 780.8 ± 63.5 | 48 ± 1.5 | 38.3 ± 3.8 | 118 ± 10[b] |

[a]Slightly cohesive
[b]Cohesive failure

TABLE III

| Sample | Shear Adhesion 1" × 1", 1 kg (min) | SAFT[a] (° F.) |
|---|---|---|
| I | 1,490 ± 275[b] | 134.6 ± 0.4 |
| J | 1,470 ± 200[b] | 135.2 ± 1.3 |
| K | 1,291 ± 67[b] | 130.6 ± 1.6 |
| L | 1,259 ± 151[b] | 129.8 ± 0.6 |

[a]SAFT Shear Adhesion Failure Temperature
[b]Cohesive Failure

In all cases, the adhesive samples prepared with a surfactant according to the present invention (A, C, E, G, I and K) performed as well as or better than adhesive samples prepared using the prior art tackifier (B, D, F, H, J, and L). For example, adhesives prepared according to the present invention give results superior to the prior art when evaluated for adhesive tack by Polyken probe. At a tackifier concentration of about 40% (Samples E and F) with the SBR latex the present adhesive was significantly better than the prior art. With the acrylic latex (Samples I–L), the present adhesive performed as well as the prior art.

The adhesive of the present invention was also superior when loop tack was measured. At tackifier concentrations of from about 30% to about 50%, with the SBR latex (Samples C–H), the adhesive samples prepared with a surfactant of the present invention had loop tack results significantly better than the prior art. Those samples prepared with the acrylic latex and the dispersion of the present invention (Samples I and K) also showed superior loop tack, especially Sample I prepared with 20% tackifier resin of the present invention.

The adhesive prepared from the SBR latex with the dispersion of the present invention showed a significantly superior 180° peel at tackifier concentrations of between about 40% and about 50% (Samples E and G). The adhesives prepared with the acrylic latex and the tackifier of Example II (Samples I and K) had peel values equivalent to those adhesives of the prior art (Samples J and L).

The shear adhesion of the SBR adhesives prepared with lesser amounts of tackifier resin (Samples A–D) was greater than 10,000 minutes. The adhesive prepared with 40% of the dispersed tackifier using a surfactant of the present invention (Sample E) had a significantly better shear adhesion than the adhesive of the prior art dispersions (Sample F). At all other concentrations of tackifier resin (Samples G–L) the adhesive of the present invention performed as well as the prior art adhesive.

The shear adhesion failure temperatures (SAFT) of the acrylic adhesives (Samples I–L) were comparable for both those adhesives prepared using the dispersion of the present invention (Samples I and K) and those adhesives prepared using prior art dispersions using more conventional surfactants (Samples J and L).

Therefore, the present invention provides a surfactant for producing a stable water-dispersed rosin ester tackifier at atmospheric pressure. This dispersed rosin tackifier is fully compatible with acrylic and styrene-butadiene rubber latexes. The adhesive properties resulting from the mixture of the stabilized tackifier dispersion and the elastomer latex are as good as or better than the properties of adhesives prepared according to the prior art.

Various of the features of the invention which are believed to be new are set forth in the appended claims.

What is claimed is:

1. A surfactant for forming stable dispersions of rosin esters compatible with elastomeric latexes which comprises a compound of the formula $R^1$—$R^2$—$R^3$, wherein $R^1$ and $R^3$ are selected from the group consisting of a rosin and H, provided that $R^1$ and $R^3$ are not both H, and $R^2$ is selected from the group consisting of polyethylene glycol and (polyethylene glycol)-$R^4$-(polyethylene glycol) wherein $R^4$ is rosin, and wherein the polyethylene glycol has a molecular weight of from about 1,500 to about 20,000 such that the surfactant is substantially solid at room temperature.

2. The surfactant of claim 1 wherein the rosin has a molecular weight of between about 280 and about 600.

3. A stable tackifier dispersion compatible with elastomeric latexes comprising a rosin ester, tackifier, water, and a surfactant having the formula $R^1$—$R^2$—$R^3$, wherein $R^1$ and $R^3$ are selected from the group consisting of rosin and H, provided that $R^1$ and $R^3$ are not both H, and $R^2$ is selected from the group consisting of polyethylene glycol and (polyethylene glycol)-$R^4$-(polyethylene glycol) wherein $R^4$ is rosin, and wherein the PEG has a molecular weight of from about 1,500 to about 20,000.

4. The dispersion of claim 3 wherein the dispersion has a solids content of between about 50% and about 70%.

5. The dispersion of claim 3 wherein the particle size is less than about 3 micron.

6. The dispersion of claim 3 wherein the rosin has a molecular weight of between about 280 and about 600.

7. A method for preparing a surfactant for forming stable dispersions of rosin esters, said method comprising esterifying a rosin with polyethylene glycol, wherein the polyethylene glycol has a molecular weight of from about 1,500 to about 20,000.

8. The method of claim 7 wherein said esterifying further comprises heating said rosin with said polyethylene glycol at a temperature of from about 265° C. to about 285° C. under nitrogen until the acid number of the heated product is less than about 10.

9. The method of claim 8 wherein the heating is in the presence of a catalytic amount of an acid selected from the group consisting of hypophosphorous acid and phosphoric acid.

10. The method of claim 7 wherein the rosin has a molecular weight of between about 280 and about 600.

* * * * *

UNITED STATES PATENT AND TRADEMARK OFFICE
CERTIFICATE OF CORRECTION

PATENT NO. : 6,274,657 B1
DATED : August 14, 2001
INVENTOR(S) : John T. Geoghegan and Long S. Wang It is certified that error appears in the above-identified patent and that said Letters Patent is hereby corrected as shown below:

Column 4,
TABLE II, 4th column heading, delete "(oz.in)" and insert therefore -- (oz/in) --.

Column 6, claim 9,
Line 24, delete "presence" and insert therefor -- pressure --.

Signed and Sealed this

Twenty-sixth Day of February, 2002

Attest:

JAMES E. ROGAN
Attesting Officer
Director of the United States Patent and Trademark Office